United States Patent
Kumar et al.

(10) Patent No.: US 7,142,541 B2
(45) Date of Patent: Nov. 28, 2006

(54) DETERMINING ROUTING INFORMATION FOR AN INFORMATION PACKET IN ACCORDANCE WITH A DESTINATION ADDRESS AND A DEVICE ADDRESS

(75) Inventors: Alok Kumar, Santa Clara, CA (US); Raj Yavatkar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 953 days.

(21) Appl. No.: 10/216,369

(22) Filed: Aug. 9, 2002

(65) Prior Publication Data
US 2004/0028040 A1 Feb. 12, 2004

(51) Int. Cl.
*H04L 12/28* (2006.01)
*G06F 12/00* (2006.01)

(52) U.S. Cl. .......................... 370/392; 711/2; 711/120; 711/121; 711/123; 711/125; 711/126; 711/129; 711/130; 711/131; 711/132

(58) Field of Classification Search ...................... None
See application file for complete search history.

(56) References Cited

U.S. PATENT DOCUMENTS

| | | | |
|---|---|---|---|
| 5,289,390 A * | 2/1994 | Unverrich | 345/1.1 |
| 5,524,254 A * | 6/1996 | Morgan et al. | 709/245 |
| 6,055,236 A * | 4/2000 | Nessett et al. | 370/389 |
| 6,181,698 B1 * | 1/2001 | Hariguchi | 370/392 |
| 6,631,419 B1 * | 10/2003 | Greene | 709/238 |
| 6,961,336 B1 * | 11/2005 | Coggeshall | 370/389 |
| 2002/0105956 A1 * | 8/2002 | Saito | 370/401 |
| 2003/0161309 A1 * | 8/2003 | Karuppiah | 370/392 |

FOREIGN PATENT DOCUMENTS

| | | |
|---|---|---|
| WO | WO 01/05116 A2 | 1/2001 |
| WO | WO 02/19624 A2 | 3/2002 |

OTHER PUBLICATIONS

Kuo, Geng-Sheng et al: "A New Architectural Concept of Hierarchical Routing Scheme for IPv6 in Future High-Speed Large Global Internet", Telecommunications Symposium, 1998. Its '98 Proceedings. SBT/IEEE International Sao Paulo, Brazil Aug. 9-23, 1998, New York, NY, USA, IEEE, US, XP010300847, ISBN: 0-7803-5030-8, pp. 638-643.

"PCT Notification of Transmittal of the International Search Report or the Declaration", dated Feb. 2, 2004 for PCT/US03/24502, 8pgs.

\* cited by examiner

*Primary Examiner*—Chau Nguyen
(74) *Attorney, Agent, or Firm*—Buckley, Maschoff & Talwalkar LLC

(57) ABSTRACT

According to some embodiments, routing information for an information packet is determined in accordance with a destination address and a device address.

16 Claims, 10 Drawing Sheets

DETERMINING ROUTING INFORMATION FOR AN INFORMATION PACKET IN ACCORDANCE WITH A DESTINATION ADDRESS AND A DEVICE ADDRESS

BACKGROUND

A network device may facilitate an exchange of information packets via a communication network. For example, a network switch or router can receive streams of information packets from other devices, such as Personal Computers (PCs). The network device may then transmit the information packets to other network devices, such as to other network switches or routers. Those network devices may in turn forward the information packets until they reach an appropriate destination.

Each information packet may be associated with a destination address. A network device can then process and transmit the information packet as appropriate (e.g., to another network switch or router) in accordance with the destination address. To facilitate this process, the network device may store a list of destination addresses and associated routing information in memory. Accessing such a list, however, may take a considerable amount of time—especially when the network device needs to search for routing information associated with a lengthy destination address. Moreover, the amount of time required to access the information may degrade the performance of a high-speed network device.

DETAILED DESCRIPTION

Figure 1:
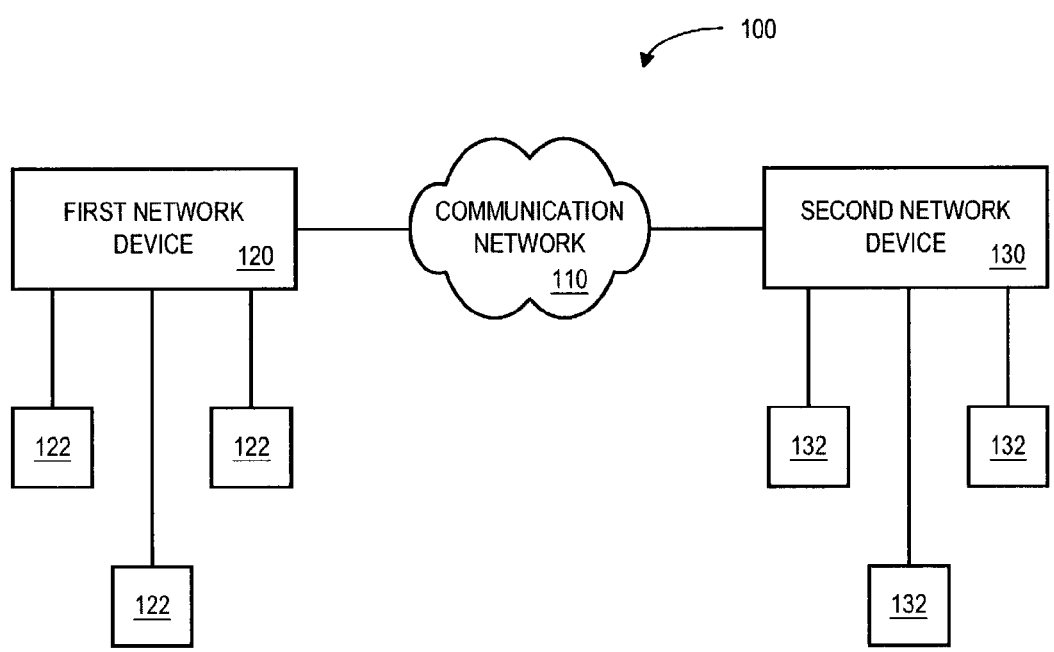
FIG. 1 is a block diagram of a communication system.

FIG. 1 is a block diagram of a communication system 100. In particular, a first network device 120 may exchange information with a second network device 130 via a communication network 110. The network devices 120, 130 may comprise, for example, network switches or routers, such a device associated with the 1×P2400 network processor available from INTEL®.

The communication network 110 may be associated with, for example, a Local Area Network (LAN), a Metropolitan Area Network (MAN), a Wide Area Network (WAN), a Fast Ethernet network, a wireless network, a fiber network, and/or an Internet Protocol (IP) network, such as the Internet, an intranet, or an extranet. Note that the communication network 110 may include different types of networks and any number of other network devices (e.g., intermediate switches and routers).

As illustrated in FIG. 1, the first network device 120 can communicate with a number of associated devices 122 (e.g., PCs). Similarly, the second network device 130 can communication with a number of associated devices 132. In this way, one device 122 may transmit a stream of information packets to another device 132.

Network Device

Figure 2:
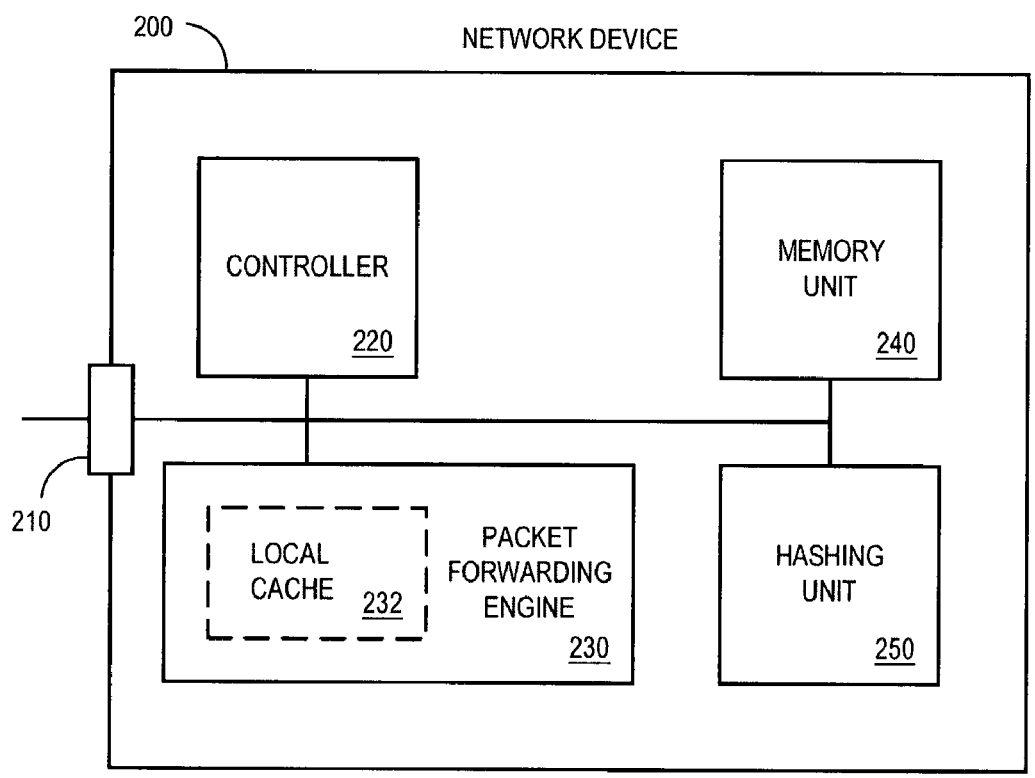
FIG. 2 is a block diagram of a network device according to some embodiments.

FIG. 2 is a block diagram of a network device 200 according to some embodiments. The network device 200 includes a communication port 210 that may be used to exchange information packets with other devices. Note that more than one communication port 210 may be associated with the network device 200.

The network device 200 also includes a controller 220. The controller 220 may comprise, for example, a control plane processor (e.g., an Intel® XScale™ processor) that performs control and system management functions as well as executing real-time applications.

The network device 200 further includes a packet forwarding engine 230 that may be used to determine routing information based on an information packet's associated destination address. The packet forwarding engine 230 may also facilitate flow categorization, congestion management, and set queuing priorities. According to some embodiments, the packet forwarding engine 230 includes a local cache 232. The local cache 232 may be used, for example, to store information that can be accessed by the packet forwarding engine 230 in a relatively fast manner.

The packet forwarding engine 230 may also access a memory unit 240, such as a Static Random Access Memory (SRAM) unit. Note that the memory unit 240 may be able to store more information than the local cache 232. However, it may take more time for the packet forwarding engine 230 to access this information.

The packet forwarding engine 230 may also access a hashing unit 250, such as a hashing unit 250 that supports a 128-bit hash function. Although a particular network device 200 is illustrated in FIG. 2, according to other embodiments the network device 200 may include fewer and/or different components. For example, the network device 200 may include multiple packet forwarding engines 230 to process information packets.

Method of Accessing a Local Cache

Figure 3:
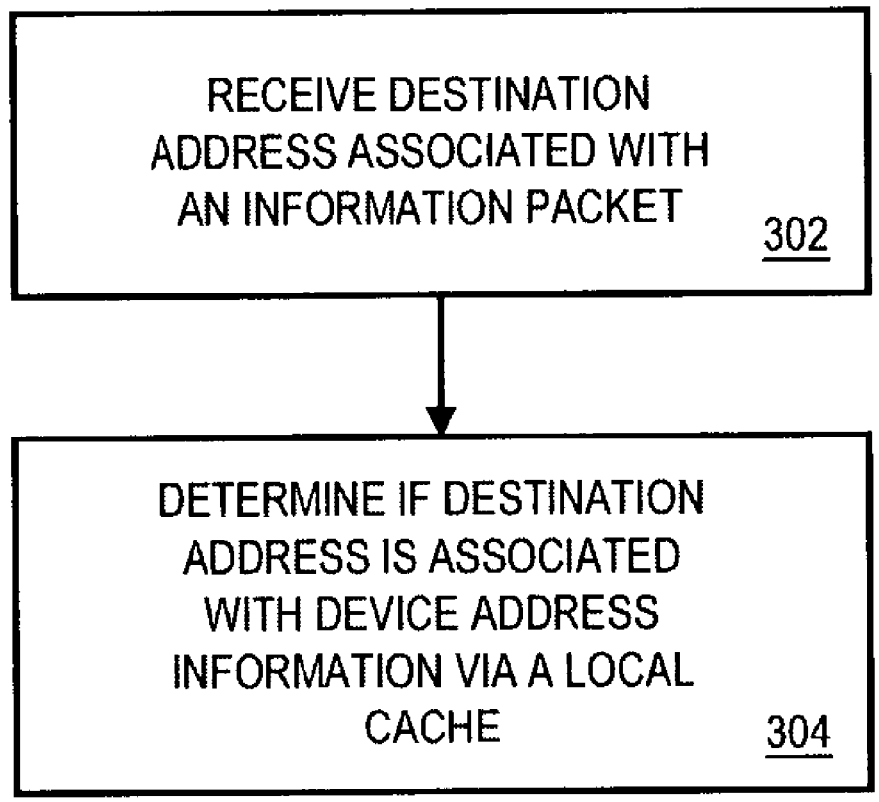
FIG. 3 is a flow chart of a method according to some embodiments.

FIG. 3 is a flow chart of a method according to some embodiments. The flow charts described herein do not imply a fixed order to the actions, and embodiments may be practiced in any order that is practicable. The method may be associated with, for example, the network device 200 and/or packet forwarding engine 230 illustrated in FIG. 2.

Figure 4:
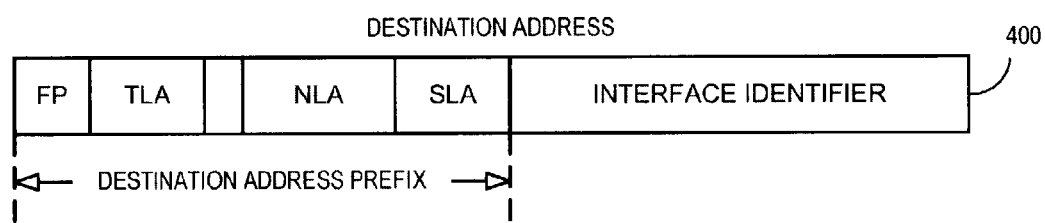
FIG. 4 illustrates a destination address according to some embodiments.

At 302, a destination address associated with an information packet is received (e.g., by the packet forwarding engine 230). By way of example, FIG. 4 illustrates a destination address 400 according to some embodiments. In particular, the destination address 400 shown in FIG. 4 is an Internet Protocol version 6 (IPv6) address as defined in Request For Comment 2373, "IP Version 6 Addressing Architecture" published by the Internet Engineering Task Force (July, 1998).

The 128-bit IPv6 destination address 400 includes a 64-bit "destination address prefix" and a 64-bit interface identifier. The destination address prefix comprises three bits of Format Prefix (FP) information, 13 bits of Top Level Aggregation (TLA) information, 24 bits of Next Level Aggregation (NLA) information, and a 16 bits of Site Level Aggregation (SLA) information. Note that the destination address prefix also includes eight bits of reserved information (e.g., which may be set to zero).

The FP information identifies the destination address 400 as a unicast (or anycast), a multicast, a link local, or another type of address. In particular, the destination address 400 illustrated in FIG. 4 represents information for a unicast (or anycast) address.

Note that the IPv6 destination address 400 is structured to reflect a hierarchy or aggregation of addresses. The first hierarchical level is the TLA information, followed by the NLA information and then the SLA information. Finally, the interface identifier can be used to distinguish among hosts local to a site (e.g., a globally or locally unique identifier). As a result, a network device may determine an appropriate route for an information packet based on the destination address prefix (e.g., the FP, TLA, NLA, and SLA information) without regard to the interface address—unless the information packet's final destination is related to the network device (e.g., the final destination may be in a subnet directly connected to the network device).

Referring again to FIG. 3, it is determined at 304 if the destination address is associated with "device address information." As used herein, the phrase "device address information" may refer to, for example, a device address prefix associated with a network device.

Due to the hierarchical allocation of IPv6 addresses, specific routing information will not typically be present in a network device (e.g., a router) unless that device lies at the edge of the network and the destination address is attached to a subnet connected to the network device. On the other hand, information packets destined to a network "inside" the domain of a network device (e.g., when an edge router connects a local network to the rest of a network) may require specific routes. Note that, in this case, the destination address prefix associated with the information packet may be same as the network device's address prefix. In other words, more specific routes in a network device are expected to have the prefix of the address of the network device. For an IPv6 network device, the address on each interface may share a common IPv6 prefix (with the number of bits in the prefix depending on the position of the router in the hierarchy). Thus, routing information may be cached for addresses that match all (or parts) of the device address prefix (e.g., a router's IPv6 address prefix). According to some embodiments, the determination of whether the destination address is associated with the device address information (e.g., whether a destination address prefix matches a device address prefix) is performed via a local cache 232. For example, the packet forwarding engine 230 may perform this determination using information stored in a local memory. According to some embodiments, the information stored in local memory comprises a subset of a trie data structure stored in the memory unit 240.

Trie Data Structure

Figure 5:
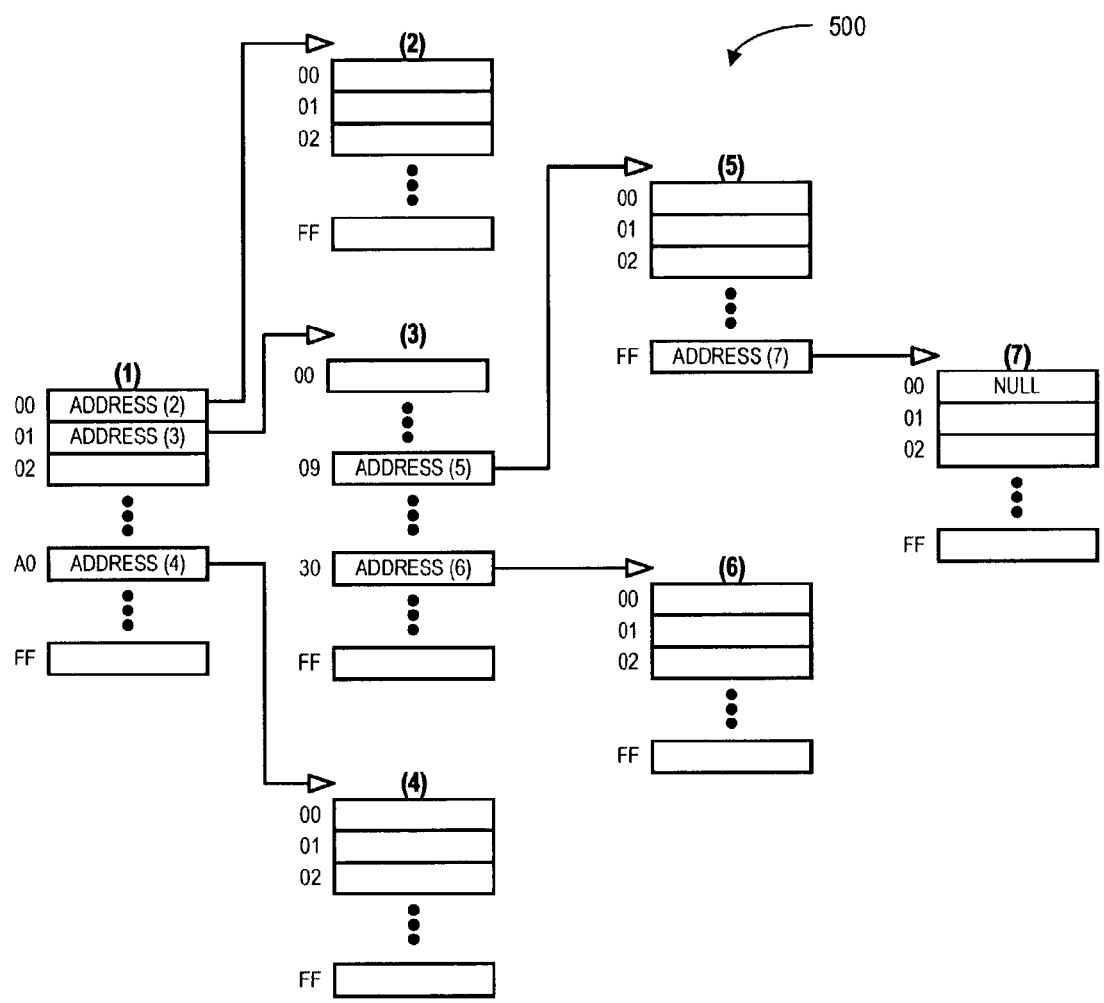
FIG. 5 illustrates a trie data structure according to some embodiments.

FIG. 5 illustrates a trie data structure 500 according to some embodiments. In particular, the trie data structure 500 illustrated in FIG. 5 includes seven trie tables. Each table has entries associated with "00" through "FF," and each entry may represent an address or pointer associated with another table (i.e., in the next level of the trie data structure 500) or a "null" (e.g., indicating that no other table is associated with that entry).

By way of example, consider a 128-bit destination address of 01:09:FF:00:: (with "::" indicating that the remaining bits are zero). The first eight bits of the address (i.e., "01") is used as an index in the first, or base, trie table. Note that the entry associated with "01" in the first table illustrated in FIG. 5 points to the third table. The next eight bits of the address (i.e., "09") are then used as an index in the third table, resulting in an entry that points to the fifth table. Similarly, the next eight bits (i.e., "FF") are used as an index in the fifth table, resulting in an entry that points to the seventh table. The next eight bits (i.e., "00"), however, result in a null entry indicating that no further information for that address is stored in the trie data structure 500.

Figure 6:
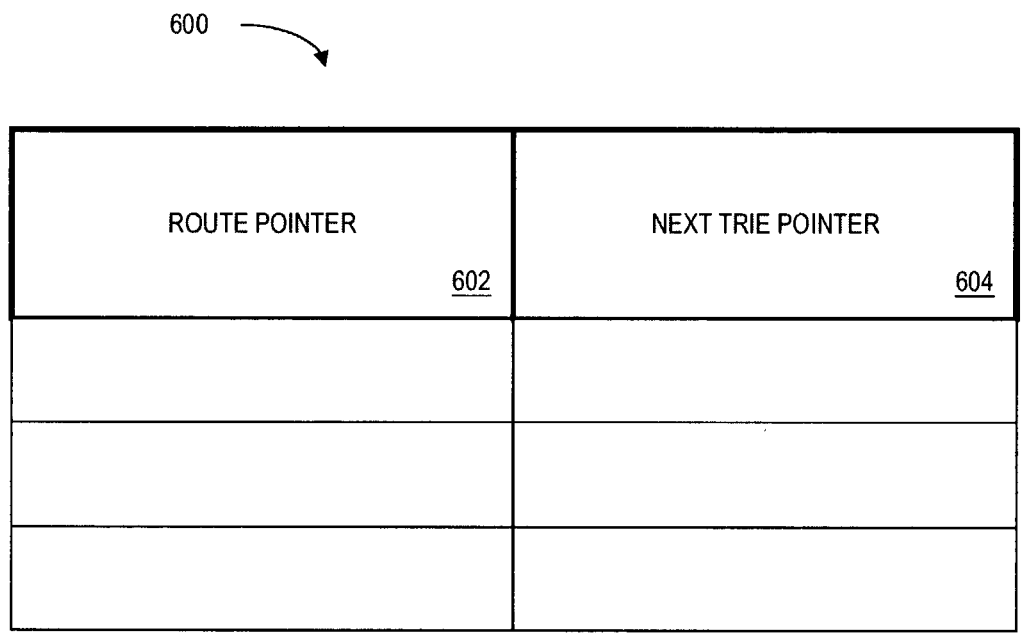
FIG. 6 illustrates information that may be associated with a trie data structure according to some embodiments.

The trie data structure 500 may be used to determine routing information associated with a destination address prefix or an entire destination address. For example, FIG. 6 illustrates information 600 that may be associated with a trie data structure 500 according to some embodiments. The information 600 may be stored, for example, in the memory unit 240. According to some embodiments, a 16-bit route pointer 602 represents a routing table entry associated with a particular trie table entry. The route pointer 602 may also, according to some embodiments, indicate that no valid routing information is available (e.g., when the 16-bit route pointer 602 has a null value). In addition, a 16-bit next trie pointer 604 represents a trie table that should be searched next or indicates that the search should terminate (e.g., when the next trie pointer 604 has a null value).

In this way, the trie data structure 500 and associated information 600 may be used to determine an appropriate route pointer 602 for a packet of information. For example, a route pointer 602 may be extracted each time a match is found in the trie data structure 500. If the extracted route pointer 602 is valid (e.g., not null), the current route pointer may be updated with the extracted route pointer 602. Of course, if the extracted route pointer 602 is not valid (e.g., null), the current route pointer may remain unchanged. When the trie lookup algorithm terminates (e.g., the next tree pointer 604 is null), the current route pointer may be used to transmit the information packet.

By way of example, consider again the trie data structure illustrated in FIG. 5 and a 128-bit destination address of 01:09:FF:00::. Before executing a tric lookup algorithm, a current router pointer may be initialized to a default value (e.g., "35"). When the first trie table is accessed (e.g., entry "01" based on the destination address), assume that a route pointer 602 value of "22" is extracted. The current router pointer would then be updated (e.g., from 35 to 22) and the third trie table would be accessed (e.g., entry "09" based on the destination address). Assume that the route pointer 602 associated with this entry in the third trie table is "0." In this case, no valid routing information is available and the current route pointer would remain unchanged (e.g., as "22"). The process may then be repeated until the trie lookup algorithm terminates (e.g., when the null entry in the seventh trie table is accessed). According to some embodiments, a subset of the information 600 is also stored in the local cache 232 of the packet forwarding engine 230. For example, entries associated with the device address may be stored in the local cache 232.

Determination of Routing Information

Figure 7:
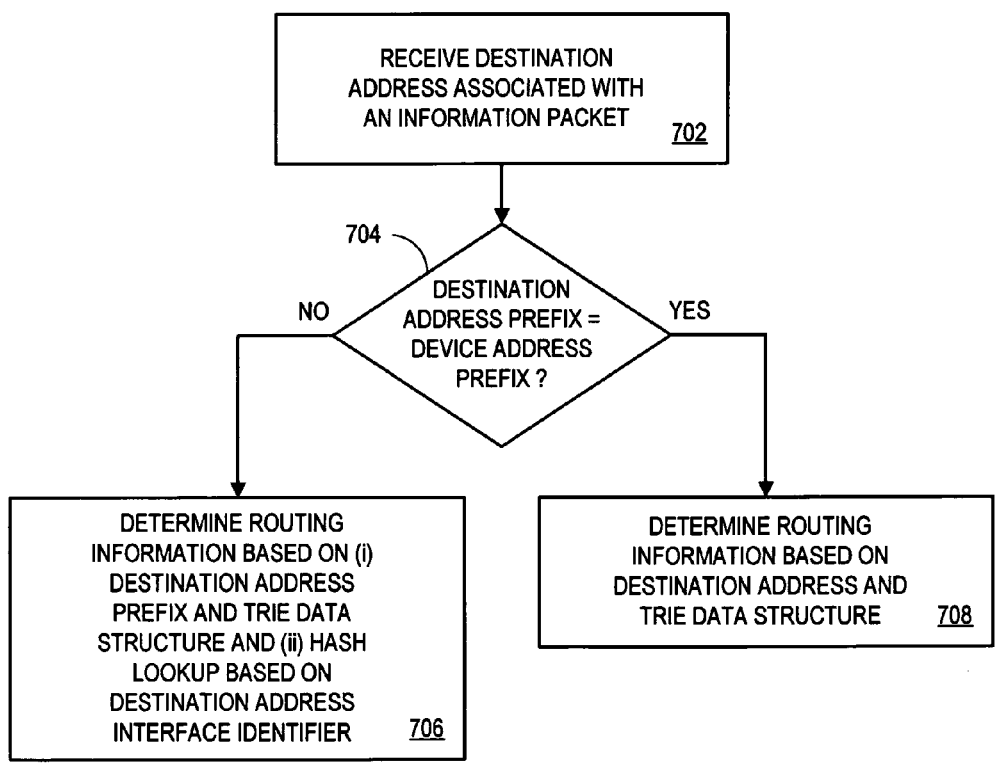
FIG. 7 is a flow chart of a method to determine routing information according to some embodiments.

FIG. 7 is a flow chart of a method to determine routing information according to some embodiments. The method may be performed, for example, by the network device 200 shown in FIG. 2 (e.g., by the packet forwarding engine 230).

At 702, a destination address associated with an information packet is received. The destination address may include, for example, a destination address prefix and a destination address interface identifier.

At 704, it is determined whether or not the destination address prefix matches a device address prefix (i.e., the device address prefix that is associated with the network device). For example, the packet forwarding engine 230 may use an LPM algorithm to determine if the destination address prefix matches the device address prefix using information stored in the local cache 232. Note that the information stored in the local cache 232 may comprise a trie data structure (e.g., a trie data structure that stores information associated with the device address prefix without storing all potential destination address prefixes).

If the destination address prefix does not match the device address prefix at 704, routing information is determined at 706 based on the destination address prefix and a trie data structure. For example, the packet forwarding engine 230 may access trie data structure in the memory unit 240 to determine a route pointer for the information packet based on the first 64 bits of an IPv6 destination address. Note that, in this case, the last 64 bits of the IPv6 address (i.e., the interface identifier) may represent a level of detail that is not required to determine an appropriate route (because the network device 200 is probably not directly associated with the destination device as reflected by the non-matching destination address prefix and device address prefix). Instead, the packet forwarding engine 230 can simply perform a hash lookup based on the interface identifier to determine appropriate routing information (e.g., via the hashing unit 250).

If the destination address prefix matches the device address prefix at 704, routing information is determined at 708 based on the entire destination address and the trie data structure stored in the memory unit 240. For example, since the network device 200 is likely related to the destination device (as reflected by the matching destination address prefix and device address prefix), the level of detail represented by the last 64 bits of the IPv6 address may be required to determine an appropriate route for the information packet.

The network device 200 may then arrange for the information packet to be transmitted in accordance with the determined routing information (e.g., by forwarding the information packet using the route pointer).

EXAMPLE

Figure 8:
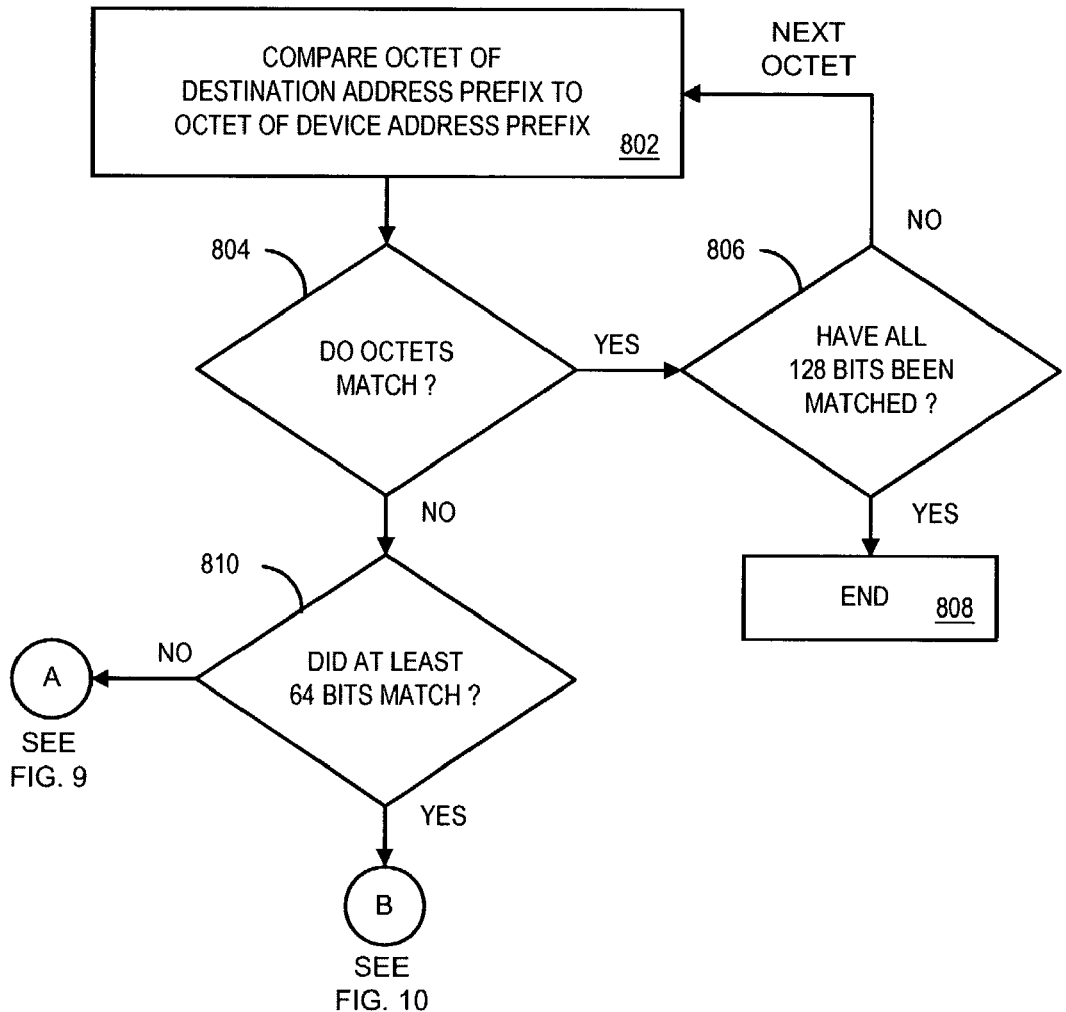
FIGS. 8 through 10 are a flow chart of a method to determine routing information according to some embodiments.
Figure 9:
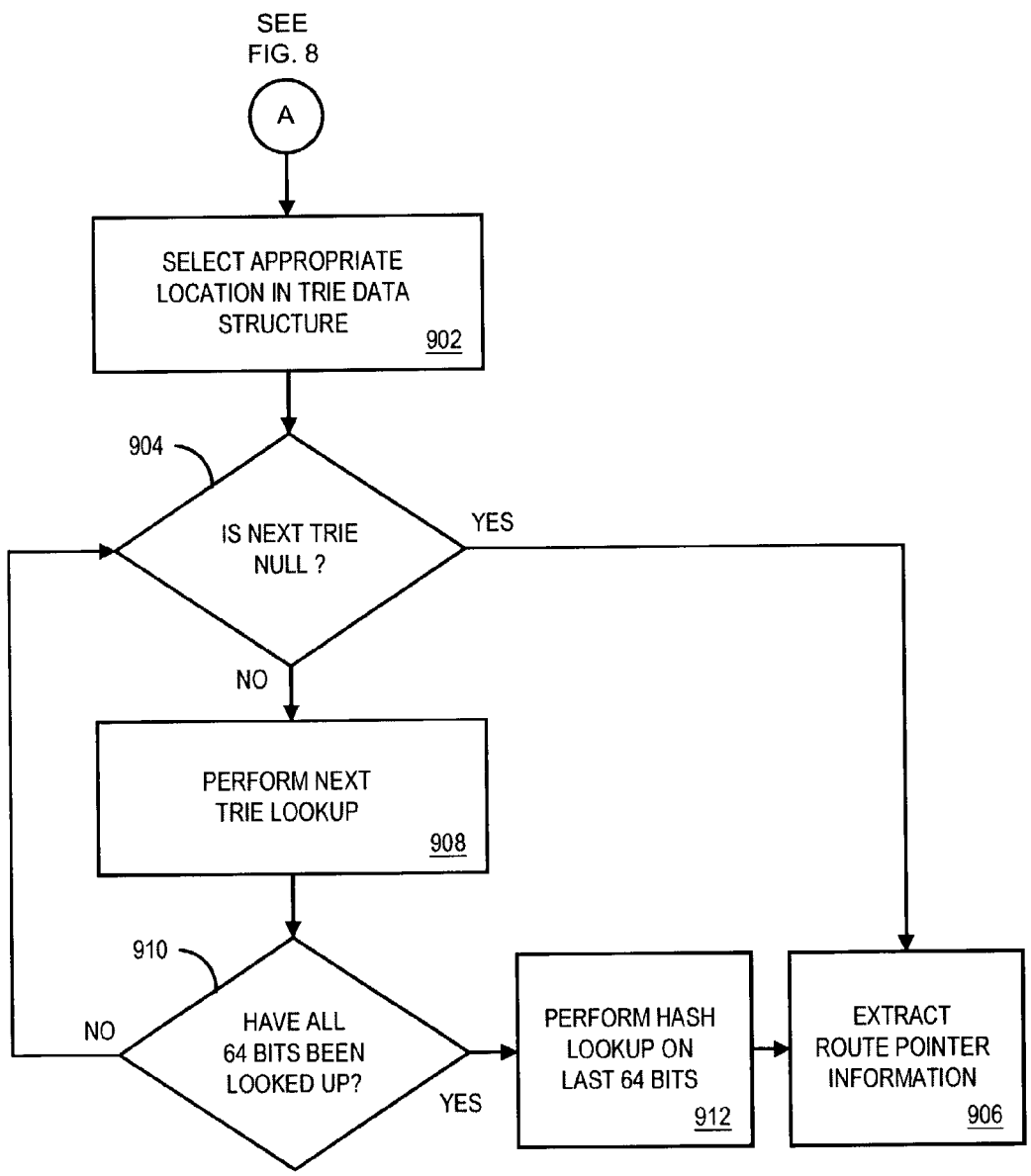
Figure 10:
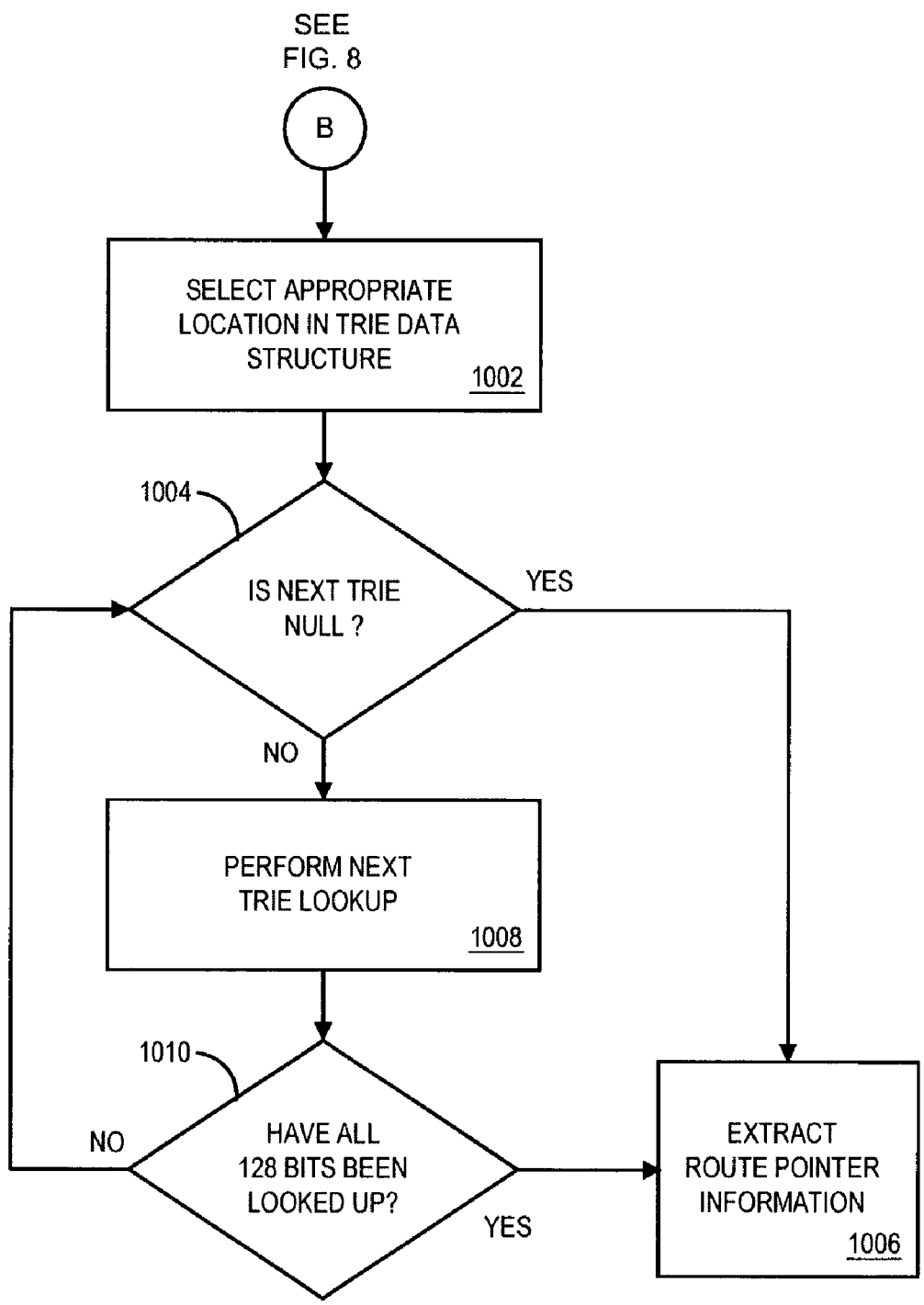

FIGS. 8 through 10 are a flow chart of a method to determine routing information according to some embodiments. The method may be performed, for example, by a packet forwarding engine 230 when an IPv6 unicast (or anycast) destination address is processed. Note that other types of addresses (e.g., a multicast address) may instead be forwarded to the controller 220 for exception processing. Also note that default routing information may initially be determined for the destination address.

At 802, the first octet of the destination address is compared to the first octet of the device address. For example, the packet forwarding engine 230 may compare the first octet using a trie data structure stored in the local cache 232. In this case, appropriate routing information can also be determined when the first octet matches (e.g., to replace default routing information).

If the first octet matches at 804, it is determined whether all 128 bits of the destination address and device address have been compared at 806. If all 128 bits have not been compared, the process continues with the next octet of the destination address and device address. If all 128 bits have been compared and have matched, the process ends at 806. That is, the entire destination address and device address matched, and all of the routing information may be accessed in the local cache 232 (and there is no need to access the memory unit 240).

The process continues until it is found at 804 that a octet of the destination address does not match the device address. Note that for each matched octet, appropriate routing information may be extracted from the local cache 232 (e.g., when a valid route pointer is extracted it may replace the current route pointer). When it is found that a octet of the destination address does not match the device address, it is determined whether or not at least 64 bits of the destination address matched the device address at 810. If less than 64 bits matched (and the destination device is probably not related the network device 200), the process continues at FIG. 9. If at least 64 bits matched (e.g., the destination device is probably related the network device 200, such as by being part of a network within the domain of the network device 200), the process continues at FIG. 10. Thus, the process of FIG. 9 begins after it has been determined that less than all of the first 64 bits in the destination address matched the device address prefix. At 902, an appropriate location in a trie data structure is selected. The trie data structure may be stored, for example, in the memory unit 240.

According to some embodiments, the appropriate location is selected based on the number of octets that did match in FIG. 8. If no octets had matched in FIG. 8, for example, the first table in the trie data structure may be selected. On the other hand, a table deeper in the trie data structure may be selected if a number of octets had matched.

The trie data structure is then used to determine if any additional routing information is associated with the remaining octets of the destination address prefix (e.g., beginning with the first octet that did not match the device address prefix). In particular, if the next trie entry is null at 904 then the current route pointer may be extracted at 906 (i.e., because no more routing information is cached in the trie data structure).

If the next trie entry is not null, the next tree lookup is performed at 908 (and the current route pointer may be updated as appropriate). If all 64 bits of the destination address prefix have not yet been looked up at 910, the process continues at 904.

When all 64 bits of the destination address prefix have been looked up, a hash lookup is performed on the last 64 bits of the destination address (i.e., the interface identifier) at 912 and the route pointer information is extracted at 906 (e.g., the current route pointer). Because the network device 200 is probably not related to the destination device (i.e., because the destination address prefix did not match the device address prefix in FIG. 8), the level of detail contained in the last 64 bits may not be needed to determine an appropriate route for the information packet. The network device 200 may then arrange for an information packet to be transmitted in accordance with the determined route pointer information.

Refer now to the process of FIG. 10, which begins after it has been determined (in FIG. 8) that all of the first 64 bits in the destination address matched the device address prefix. At 1002, an appropriate location in a trie data structure is selected. The trie data structure may be stored, for example, in the memory unit 240. Note that the level of the trie data structure selected at 1002 may always be the same (i.e., because 64 bits always matched in FIG. 8).

The trie data structure is then used to determine routing information based on the remaining octets of the destination address (e.g., beginning with the first octet of the interface identifier). In particular, if the next trie entry is null at 1004, the current route pointer may be extracted at 1006 (i.e., because no more routing information is cached in the trie data structure).

If the next trie entry is not null, the next tree lookup is performed at 1008 (and the current route pointer may be updated as appropriate). If all 128 bits of the entire destination address (i.e., the 64-bit destination address prefix in FIG. 8 and the 64-bit interface identifier in FIG. 10) have not yet been looked up at 1010, the process continues at 1004. Note that in this case, a hash lookup of the 64-bit interface identifier might not provide sufficient routing information (e.g., because the network device 200 is probably related to the destination device, such as by being part of a network within the domain of the network device 200).

When all 128 bits of the destination address have been looked up, the route pointer information is extracted at 1006 (e.g., the current route pointer). The network device 200 may then arrange for an information packet to be transmitted in accordance with the determined route pointer information.

Referring again to FIG. 5, assume that a router has a device address prefix of 01:09:FF:24. As a result, entries 01 in the first table, 09 in the third table, and FF in the fifth table may be stored in a trie data structure at the local cache 232. Now assume that a destination address of 01:30:: is received. In this case, the first octet (i.e., 30) may be matched in the local cache 232, but the packet forwarding engine 230 will be unable to match the second octet (i.e., 30). As a result, the packet forwarding engine 230 may then examine the third table of a larger trie structure stored in the memory unit 240 (e.g., to determine if more routing information is available for that destination address).

Accordingly, some embodiments may use the hierarchical nature of IPv6 addressing to reduce the worst case time of trie data structure lookup.

Device Address Prefix Maintenance

The device address prefix may be stored, for example, in a data structure and updated as appropriate (e.g., by code that is executed by the controller 220). Such a data structure may then be read by one or more packet forwarding engines 230 that perform a route lookup process. For example, the data structure may be stored in the memory unit 240. According to another embodiment, the packet forwarding engine 230 executing a route lookup makes a local copy of the device address prefix in the local cache 232.

If the device address prefix changes, the controller 220 may notify the packet forwarding engine 230 so that the local copy may be updated accordingly. For example, the controller 220 may generate a signal and the packet forwarding engine 230 may look for the signal before processing a packet of information. When the signal is present, the packet forwarding engine 230 may copy the new device address prefix from the memory unit 240 to the local cache 232. As another approach, the packet forwarding engine 230 may periodically copy the device address prefix from the memory unit 240 to the local cache 232 (e.g., regardless of whether the device address prefix has changed).

Trie Data Structure Design Considerations

The size of a trie data structure may depend on the requirements of an IPv6 implementation. A larger structure may lead to less lookups but may make route updates more difficult due to prefix expansions (e.g., the network device 200 may need to update several entries in the trie data structure in order to update a single route entry).

According to one embodiment, all trie tables have 8-bit entries. According to another embodiment, the first trie table has 16-bit entries and the other tables have 8-bit entries. Note that an initial 16-bit trie table may be impractical if smaller prefixes need to be expanded to 16 bits to update route entries. For example, to add a prefix of length 12, 16 entries (i.e., 2 to the fourth power) may be needed with the 16-bit trie table.

Moreover, a large trie data structure may consume more memory as compared to a smaller trie data structure (e.g., because a table may be statically allocated even though many entries may not be used). In smaller structures, trie tables may be allocated as needed and therefore the number of unused entries may be less.

On the other hand, if the size of a trie data structure is reduced, the worst-case memory reads for an entire IPv6 address lookup may increase. This is because the network device 200 may have to traverse through more trie tables to match the same number of bits as compared to a larger structure (i.e., because each trie table matches fewer bits).

In the worst IPv6 case, a network device 200 may need to match the first 64 bits of a destination address to a device address prefix. In addition, a normal trie lookup may be performed for the remaining 64 bits (i.e., the interface identifier). If all trie data structures have 8 bits, then in the worst case eight separate memory unit 240 lookups may be required to determine IPv6 routing information.

By way of example, assume that a network device 200 has 8,000 routing entries. Moreover, the prefix size of the routing entries are uniformly distributed from 1 through 64. Due to hierarchical routing, all routing entries for larger prefix length should have most of their search paths in common. As an example, if a router's address is 0102:0304:0506:0707:090A:0B:0C:0D0E:0F10, then almost all routing entries with a prefix length greater than 32 will have the prefix 0102:0304::/32 due to hierarchical routing. Therefore, the number of trie tables may be very close to a best case memory requirement. If absolute hierarchical addressing is followed, the memory requirement will be 70K in the memory unit 240. Note that the actual memory requirement may depend on the distribution of the entries.

Additional Embodiments

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

For example, although some embodiments have been described with respect to IPv6 addressing, other embodiments may be associated with other addressing schemes (e.g., another hierarchical addressing scheme).

Further, although software or hardware are described as performing certain functions, such functions may be performed using software, hardware, or a combination of software and hardware (e.g., a medium may store instructions adapted to be executed by a processor to perform a method of facilitating communication). For example, functions described herein may be implemented via a software simulation of Application Specific Integrated Circuit (ASIC) hardware.

The several embodiments described herein are solely for the purpose of illustration. Persons skilled in the art will recognize from this description other embodiments may be practiced with modifications and alterations limited only by the claims.

What is claimed is:

1. A method of facilitating communication via a network device associated with a device address prefix, comprising:
   receiving a destination address associated with an information packet, the destination address including a destination address prefix and a destination address interface identifier;
   comparing the destination address prefix to the device address prefix via a trie data structure in a local cache; and
   if the destination address prefix does not match the device address prefix, determining routing information based on the destination address prefix and a trie data structure in another cache.

2. The method of claim 1, wherein the destination address is associated with Internet protocol version 6.

3. The method of claim 1, wherein the destination address prefix includes at least one of: (i) format prefix information, (ii) top level aggregation information, (iii) next level aggregation information, or (iv) site level aggregation information.

4. The method of claim 3, wherein the format prefix information is associated with at least one of a unicast or an anycast destination address.

5. The method of claim 1, wherein the routing information is further determined via a hash lookup performed on the destination address interface identifier if the entire destination address prefix is not found in the local cache.

6. The method of claim 5, wherein the routing information comprises a route pointer, and further comprising:
   arranging for the information packet to be transmitted in accordance with the route pointer.

7. The method of claim 1, wherein if the destination address prefix matches the device address prefix, the method further comprises:
   determining routing information based on the destination address and a trie data structure stored in another cache.

8. The method of claim 7, wherein the routing information comprises a route pointer, and further comprising:
   arranging for the information packet to be transmitted in accordance with the route pointer.

9. The method of claim 1, wherein the network device is associated with at least one of: (i) a packet network, (ii) an Internet protocol network, (iii) the Internet, (iv) an edge device, (v) a switch, or (vi) a router.

10. A method of facilitating communication via a network device associated with a device address prefix, comprising:
    receiving a destination address associated with an information packet, wherein the destination address comprises a destination address prefix and a destination address interface identifier;
    if the destination address prefix does not match the device address prefix, determining routing information based on: (i) the destination address prefix and a trie data structure, and (ii) a hash iookup associated with the destination address interface identifier; and
    if the destination address prefix matches the device address prefix, determining routing information based on the destination address and the tie data structure.

11. The method of claim 10, wherein the network device is associated with at least one of: (i) a packet network, (ii) an Internet protocol network, (iii) the Internet, (iv) an edge device, (v) a switch, or (vi) a router.

12. A medium storing instructions adapted to be executed by a processor to perform a method of facilitating communication via a network device associated with a device address prefix, said method comprising:
    receiving a destination address associated with an information packet, the destination address including a destination address prefix and a destination address interface identifier;
    comparing the destination address prefix to the device address prefix via a trie data structure in a local cache; and
    if the destination address prefix does not match the device address prefix, determining routing information based on: (i) the destination address prefix and a trie data structure, and (ii) a hash lookup associated with the destination address interface identifier.

13. The medium of claim 12, wherein said method further comprises:
    if the destination address prefix matches the device address prefix, determining routing information based on the destination address and the trie data structure.

14. A network device associated with a device address prefix, comprising:
    a conimunication port to receive a destination address associated with a packet of information, wherein the destination address comprises a destination address prefix and a destination address interface identifier;
    a packet forwarding engine including a local cache, wherein the packet forwarding engine is to (i) determine if the destination address prefix is associated with the device address prefix via a trie data structure stored the local cache and (ii) if the destination address prefix does not match the device address prefix, determine routing information based on the destination address prefix and a trie data structure in another cache.

15. The network device of claim 14, further comprising a controller to perform control function.

16. The network device of claim 14, further comprising a hashing unit to perform a hashing function.

* * * * *